United States Patent
Shimoda

(10) Patent No.: US 6,782,481 B2
(45) Date of Patent: Aug. 24, 2004

(54) METHOD AND APPARATUS FOR SUPPLYING BATTERY POWER TO A TIMER CIRCUIT WITHIN A PRINTER WHILE THE PRINTER IS POWERED OFF

(75) Inventor: Akiyoshi Shimoda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 555 days.

(21) Appl. No.: 09/781,330

(22) Filed: Feb. 13, 2001

(65) Prior Publication Data

US 2001/0021982 A1 Sep. 13, 2001

(30) Foreign Application Priority Data

Feb. 15, 2000 (JP) ........................................ 2000-036971

(51) Int. Cl.$^7$ ................................................ G06F 1/30
(52) U.S. Cl. ..................................................... 713/300
(58) Field of Search .............................. 713/300, 320, 713/330; 340/3.1

(56) References Cited

U.S. PATENT DOCUMENTS

| | | | |
|---|---|---|---|
| 4,313,124 A | | 1/1982 | Hara |
| 4,345,262 A | | 8/1982 | Shirato et al. |
| 4,459,600 A | | 7/1984 | Sato et al. |
| 4,463,359 A | | 7/1984 | Ayata et al. |
| 4,558,333 A | | 12/1985 | Sugitani et al. |
| 4,723,129 A | | 2/1988 | Endo et al. |
| 4,740,796 A | | 4/1988 | Endo et al. |
| 5,708,819 A | * | 1/1998 | Dunnihoo .................. 713/323 |
| 5,819,013 A | * | 10/1998 | Miyazaki et al. .......... 358/1.15 |
| 5,905,899 A | * | 5/1999 | Kim et al. .................. 713/300 |
| 5,933,581 A | * | 8/1999 | Miyazaki et al. .......... 358/1.14 |
| 5,936,645 A | | 8/1999 | Niikura et al. |
| 5,963,224 A | | 10/1999 | Shimoda |
| 5,988,781 A | | 11/1999 | Shimada et al. |
| 6,098,175 A | * | 8/2000 | Lee ............................. 713/320 |
| 6,219,496 B1 | * | 4/2001 | Kojima et al. ............... 399/43 |
| 6,317,839 B1 | * | 11/2001 | Wells ........................ 713/320 |
| 6,509,975 B1 | * | 1/2003 | Motegi ...................... 358/1.14 |
| 6,657,534 B1 | * | 12/2003 | Beer et al. .................. 340/3.1 |

FOREIGN PATENT DOCUMENTS

| | | | | |
|---|---|---|---|---|
| JP | 54-056847 | 5/1979 | | |
| JP | 59-123670 | 7/1984 | | |
| JP | 59-138461 | 8/1984 | | |
| JP | 60-71260 | 4/1985 | | |
| JP | 04-247962 | 9/1992 | | |
| JP | 05-162421 | 6/1993 | | |
| JP | 05-318879 | 12/1993 | | |
| JP | 07-009686 | 1/1995 | | |
| JP | 08-147075 | 6/1996 | | |
| JP | 09116665 A | * | 5/1997 | ............ H04N/1/00 |

* cited by examiner

Primary Examiner—Thomas Lee
Assistant Examiner—Mark Connolly
(74) Attorney, Agent, or Firm—Fitzpatrick, Cella, Harper & Scinto

(57) ABSTRACT

There is disclosed a power supply apparatus which can reduce consumption power while an electronic device such as a printing apparatus or the like is not in use irrespective of the scale of a control circuit of that device. Such unit supplies electric power from a battery 308 to detect an ON instruction of a power switch 401 even after an OFF instruction to the power switch is detected, so as to detect the ON/OFF instruction to the power switch 401 which is used for controlling electric power supply from a power supply circuit 20 to a print controller 30 of the printing apparatus, and controls to stop power supply from the power supply unit 20 to the print controller 30 upon detecting an OFF instruction to the power switch 401.

6 Claims, 6 Drawing Sheets

F I G. 2
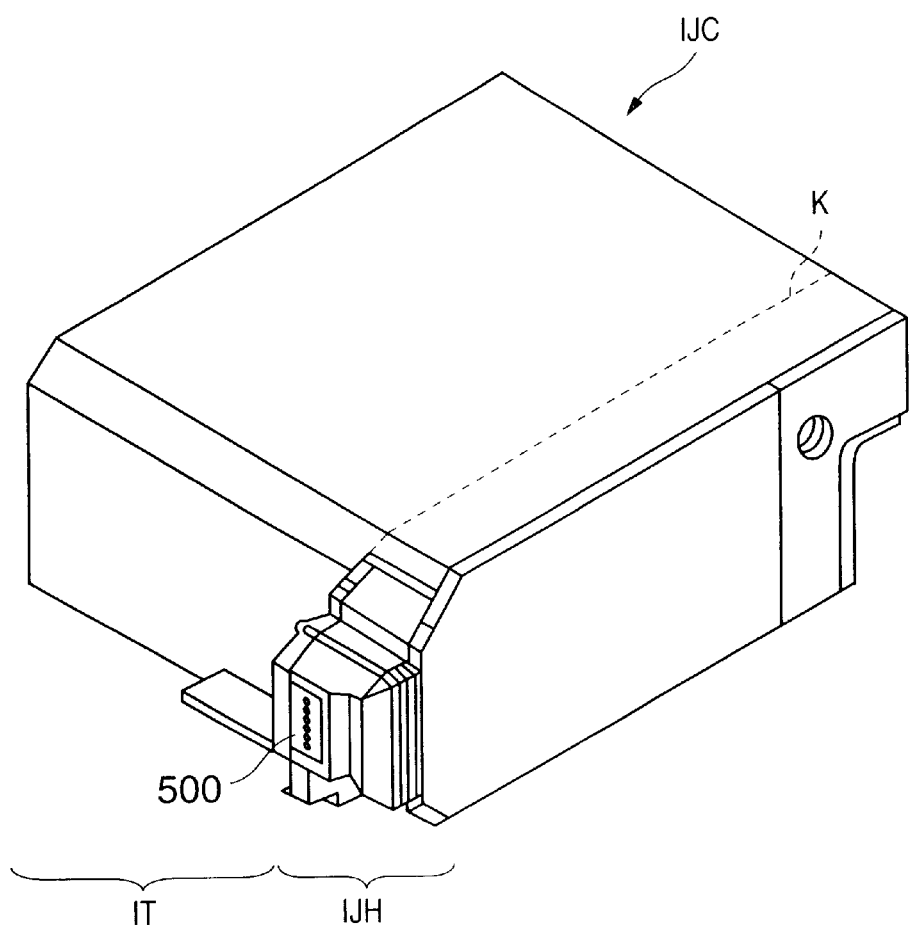

METHOD AND APPARATUS FOR SUPPLYING BATTERY POWER TO A TIMER CIRCUIT WITHIN A PRINTER WHILE THE PRINTER IS POWERED OFF

FIELD OF THE INVENTION

The present invention relates to a power supply device and power control method and, more particularly, to a power supply for supplying electric power to an electronic device such as a printer or the like, and a power control method.

BACKGROUND OF THE INVENTION

While an electronic device such as a printer or the like, which operates upon receiving electric power supplied from a commercial power supply line, is not in use, it is a common practice to stop power supply from the power supply line.

In recent years, as the functions and precision of such apparatuses have been improving, a series of operations have been required for protecting electronic circuits of the respective units of the apparatus and for preparing for switching these circuits from their enable status before power supply to such apparatus is stopped (before the apparatus goes to a power OFF state). Hence, such an apparatus is required to go to an actual power OFF state after a series of protection operations upon receiving a power OFF instruction.

In addition, since a motor circuit or the like of the printer need not receive any electric power in the power OFF state, power supply to that circuit can be stopped. However, a control circuit that controls processes of the overall apparatus is required to operate even in the power OFF state for the purpose of monitoring the next power ON instruction, supervising time, and so forth, and power supply to the control circuit cannot be completely shut off in many cases.

Therefore, in order to reduce consumption power while the apparatus is not in use, measures for lowering the operation clock frequency of such control circuit, operating a CPU in a sleep mode, and so forth are taken.

However, although the consumption power is expected to reduce since the load current is reduced, when the size of the control circuit itself of the apparatus is large, the number of elements that require power supply increases, and electric power required for driving such elements increases in proportion to the circuit scale. For this reason, when consumption power while the apparatus is not in use is reduced to a given value or less, the circuit scale of the control circuit must also be limited to a given scale or less.

To solve this problem, a circuit which is not required for actual operations such as a special switch or the like for shutting off power supply to circuits except for elements to which minimum required electric power must be kept supplied must be added.

SUMMARY OF THE INVENTION

Accordingly, it is an object of the present invention to provide a power supply apparatus and power control method, which can reduce consumption power while an electronic device such as a printer is not in use irrespective of the scale of a control circuit of that apparatus.

According to one aspect of the present invention, the foregoing object is attained by providing a power supply apparatus which comprises a power supply unit for supplying electric power to an electronic device in accordance with an instruction from a power switch, comprising detection means for detecting an ON/OFF instruction to the power switch, power supply means for supplying electric power to the detection means even after the OFF instruction to the power switch is detected, and control means for controlling to stop power supply from the power supply unit to the electronic device when the OFF instruction to the power switch is detected.

Note that the power supply means may be a battery.

As the electronic device, for example, a printing apparatus may be used, and the printing apparatus may include a timer circuit, which operates upon receiving electric power from the battery.

In such arrangement, the printing apparatus writes a time at an OFF instruction timing of the power switch into a nonvolatile memory, and when an ON instruction to the power switch is detected, and the printing apparatus becomes enabled later, the printing apparatus reads time information from the timer circuit, and executes a predetermined operation upon power ON on the basis of the read time information and the time written into the nonvolatile memory.

The power supply means may use a part of an output from the power supply unit. In this case, the power supply unit has, as an operation mode, a first operation mode for supplying electric power to the electronic device, and a second operation mode for supplying electric power to only the power supply means, and the control means switches the operation mode of the power supply unit in accordance with a detection result of the detection means. For example, when the OFF instruction to the power switch is detected, the control means switches the power supply unit to the second mode.

According to another aspect of the present invention, the foregoing object is attained by providing a method of controlling power supply to an electronic device in accordance with an instruction from a power switch, comprising: a detection step of detecting an ON/OFF instruction to the power switch by a detector; a power supply step of supplying electric power to the detector even after the OFF instruction to the power switch is detected; and a control step of controlling to stop power supply from the power supply to the electronic device when the OFF instruction to the power switch is detected.

In accordance with the present invention as described above, electric power is supplied to the detection means which detects an ON/OFF instruction to the power switch that supplies electric power from the power supply circuit to the electronic device even after the OFF instruction to that power switch is issued, and after a series of power-OFF sequences are performed, control is made to stop power supply from the power supply circuit to the electronic device.

The invention is particularly advantageous since electric power is supplied to only the detection means which detects an ON/OFF instruction to the power switch after the OFF instruction of the power switch is issued, and consumption power during power OFF can be reduced irrespective of the circuit scale of the electronic device to which electric power is supplied.

Also, since no special switch for reducing consumption power need be added, the cost of the apparatus can be prevented from increasing.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a perspective view showing the outer appearance of the structure of an ink cartridge IJC in which an ink tank and printhead are separable;

DESCRIPTION OF THE PREFERRED EMBODIMENTS

Preferred embodiments of the present invention will now be described in detail in accordance with the accompanying drawings.

Figure 1:
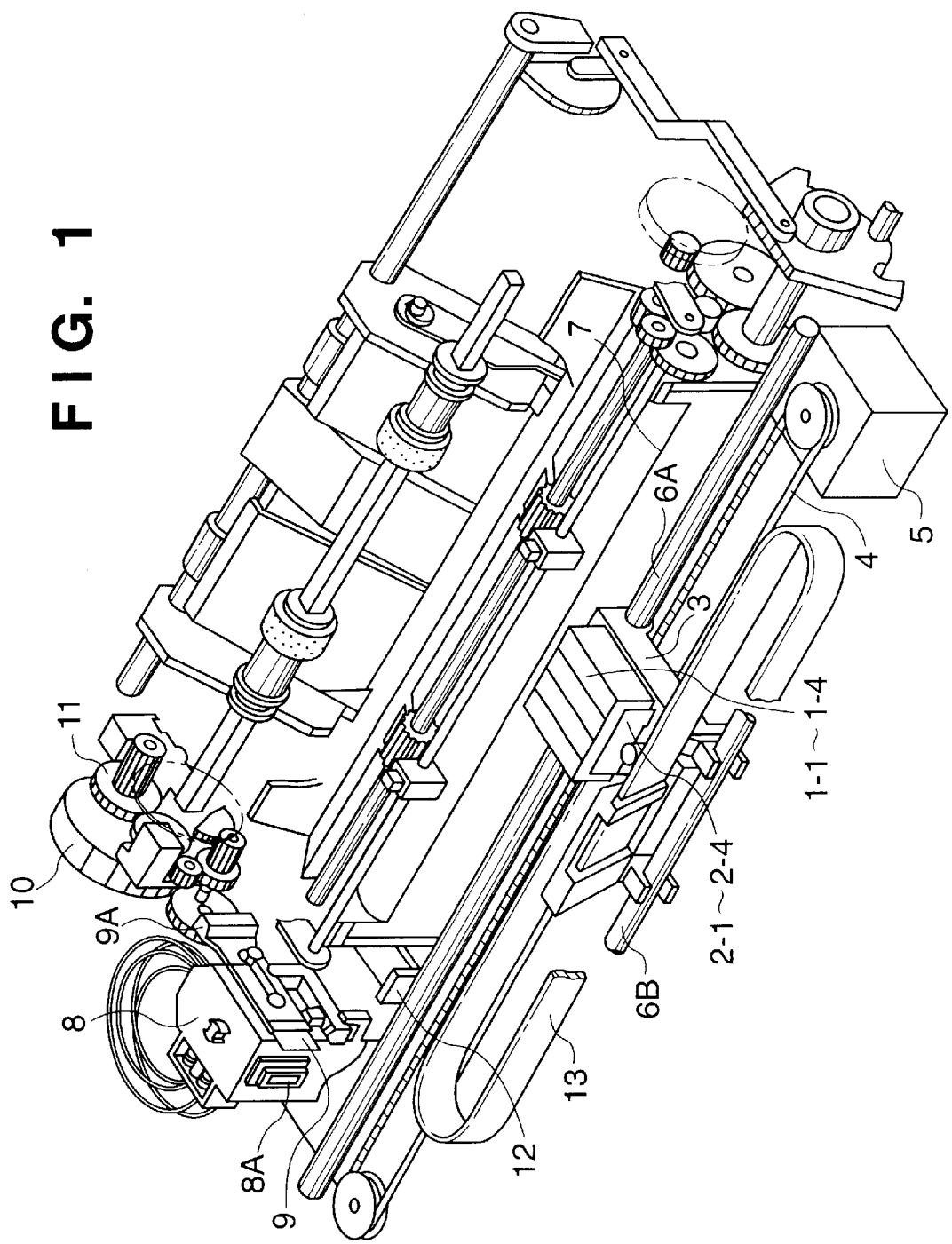
FIG. 1 is a perspective view showing the outer appearance of the structure of an ink-jet printing apparatus which incorporates a power supply unit as a typical embodiment of the present invention.

FIG. 1 is a perspective view showing the outer appearance of the structure of an ink-jet printing apparatus which incorporates a power supply unit as a typical embodiment of the present invention.

This printing apparatus comprises four printheads 2-1, 2-2, 2-3, and 2-4 which respectively discharge Bk (black), Y (yellow), M (magenta), and C (cyan) color inks so as to perform color printing in accordance with an ink-jet method, and ink tanks 1-1 to 1-4 for supplying these color inks to these printheads. This embodiment uses an ink cartridge which integrates these printheads and ink tanks. This ink cartridge is mounted on a carriage 3. The carriage 3 comprises an optical home position sensor (HP sensor; not shown).

The carriage 3 is coupled to a portion of a driving belt 4 for transferring the driving force of a carriage motor (CR motor) 5, and is movably attached to guide shafts 6A and 6B which are parallel to the scan direction of the carriage 3. The carriage 3 reciprocally moves across the entire width of a print medium such as a print sheet or the like fed from a medium feed unit, constructed by a feed motor (LF motor) 10, feed gear 11, and the like, to a platen 7 arranged to face the discharge surfaces of the printheads 2-1 to 2-4, thus printing on that print sheet.

In the printheads 2-1 to 2-4, ports of a plurality of thin pipe-shaped ink discharge nozzles are juxtaposed on the discharge surfaces which face the print surface of a print sheet, and heaters for giving discharge energy to inks supplied from the integrated ink tanks 1-1 to 1-4 are arranged in the neighborhood of these ink discharge nozzle ports. These ink discharge nozzle ports line up in a direction perpendicular to the scan direction of the carriage 3, and the four printheads 2-1 to 2-4 are juxtaposed in the carriage scan direction, as shown in FIG. 1.

The HP sensor is used to determine the reference position (home position) of the printing operation in the scan direction by detecting a projection 12 for reference position detection when the carriage 3 moves along the guide shafts 6A and 6B in its initial operation.

When the power switch of this printing apparatus is turned off or when a printing operation is not done for a predetermined period of time or longer, the four printheads 2-1 to 2-4 are capped by a cap mechanism 8A provided at the left end in the scan direction of the carriage 3. In this case, the carriage 3 moves to the position of the cap mechanism 8A with reference to the home position. When the printheads 2-1 to 2-4 are capped by the cap mechanism 8A, they undergo suction recovery by a suction mechanism 8 arranged behind the cap mechanism 8A.

As shown in FIG. 1, a cleaning blade 9 which contacts the ink discharge surfaces of the printheads 2-1 to 2-4 and removes ink, which becomes attached to the ink discharge surfaces while the carriage 3 moves from its home position to the position of the cap mechanism 8A, is provided between the projection 12 and the cap mechanism 8A.

The cleaning blade 9 does not always protrude onto the moving path of the carriage 3. At the cleaning timing of the ink discharge surfaces, the driving force of the feed motor (LF motor) 10 is transferred to the cleaning blade 9 by a gear which meshes with the other end 9A of the cleaning blade 9, and the cleaning blade 9 moves to project above the moving path of the carriage 3, thus contacting the ink discharge surfaces of the printheads 2-1 to 2-4.

The aforementioned ink-jet printing apparatus receives at a print controller (details of which will be described later) data such as image information, control commands, and the like outputted from an external host device, and rasterizes image data in units of color components in accordance with the received data. The apparatus transfers the rasterized data to the printheads, and scans the carriage 3 to discharge inks at required timings, thus executing a series of printing operations. The print controller and carriage 3 are connected via a flexible cable 13 to receive various signals and electric power required to discharge inks.

Note that the ink tanks and printheads are integrated to form an exchangeable ink cartridge. Alternatively, these ink tanks and printheads may be separably arranged, so that only ink tanks may be exchanged when inks are used up.

FIG. 2 is a perspective view showing the structure of an ink cartridge IJC in which an ink tank and printhead are separable. As shown in FIG. 2, in the ink cartridge IJC, an ink tank IT and printhead IJH are separable at the position of a boundary line K. The ink cartridge IJC has electrodes (not shown) for receiving an electrical signal supplied from the carriage 3 when it is mounted on a carriage HC. This electrical signal drives the printhead IJH to discharge ink, as described above.

Note that reference numeral 500 in FIG. 2 denotes an ink discharge port array. The ink tank IT has a fibrous or porous ink absorber for holding ink, and the ink absorber holds ink.

Figure 3:
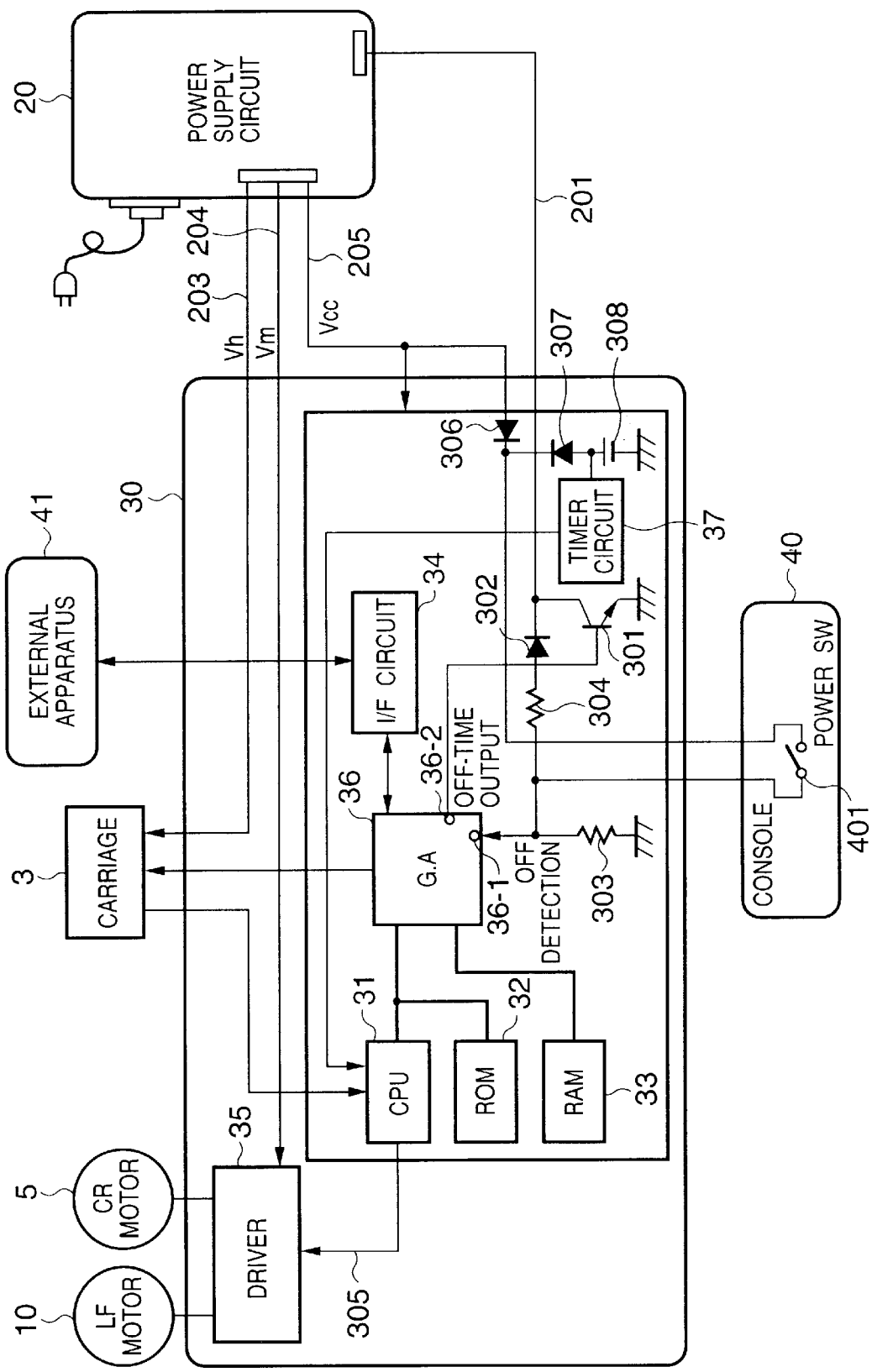
FIG. 3 is a block diagram showing the arrangement of a print controller of the printing apparatus shown in FIG. 1.

FIG. 3 is a block diagram showing the arrangement of the print controller of the printing apparatus shown in FIG. 1.

As shown in FIG. 3, a print controller 30 has a CPU 31, a ROM 32, a RAM 33, an interface circuit 34 used as an input/output interface of control commands, control data and print data sent from a host 41 as an external apparatus to the printing apparatus, a motor control circuit (Driver) 35 for driving the carriage motor (CR motor) 5 and feed motor (LF motor) 10, a gate array (G.A.) 36 which comprises a logic circuit for making various kinds of control to compensate for the operation of the CPU 31, and a timer circuit 37. In this embodiment, the carriage motor (CR motor) 5 uses a stepping motor.

The CPU 31 outputs drive signal pulses 305 of the carriage motor (CR motor) 5 to the motor control circuit 35 to move the carriage 3, and simultaneously manages the number of drive signal pulses from the home position, thus detecting the current position of the carriage 3 on the scan path. When the printheads 2-1 to 2-4 mounted on the carriage 3 have reached an ink discharge position, the CPU 31 controls to discharge ink via the gate array (G.A.) 36.

In this embodiment, the printing position in the scan direction is detected by managing driving signal pulses of the stepping motor. Alternatively, the printing apparatus may be arranged to detect the printing position by adding a dedicated encoder.

The CPU 31 controls the operation of the printing apparatus in accordance with a program pre-stored in the ROM 32 or control commands via the interface circuit 34 outputted from the host 41. For this purpose, the ROM 32 stores a control program to be executed by the CPU 31, various table data required for printhead control, a program for specifying various print operations including a power ON/OFF state, character data used to generate text data, and the like. On the other hand, on the RAM 33 a work area used by the CPU 31 to execute the control program or the like stored in the ROM 32 is defined. Also, the RAM 33 is used as a temporary storage area of print data and control codes input from the host 41 via the interface circuit 34, and as a bit data print buffer after print data is rasterized to bit data corresponding to nozzles of the printheads.

A power supply circuit 20 for supplying electric power to the printing apparatus has three different outputs, i.e., a Vh output 203 that supplies electric power to the printheads, a Vm output 204 that supplies electric power to the CR motor 5 and LF motor 10 used to move the carriage and to convey a print medium, and a Vcc output 205 that supplies electric power to the print controller 30, as shown in FIG. 3. On the other hand, an input line 201 from a power switch (PowerSW) 401 provided to a console 40 is connected to the power supply circuit 20, so that an operation mode (to be described later) of the power supply circuit 20 can be controlled in accordance with the ON/OFF state of the power switch 401.

That is, when a signal supplied via the input line 201 to the power supply circuit 20 becomes "Low" level, the power supply circuit 20 goes to a "power OFF mode" to stop the aforementioned outputs. Note that, in this embodiment, if the signal temporarily becomes "Low" level, the power supply circuit 20 goes to a "power OFF mode". By contrast, when a signal supplied via the input line 201 goes "High", the power supply circuit 20 goes to a "normal operation mode", thus starting outputs to the respective circuits.

The timer circuit 37 in this embodiment can continue time measurement operation by electric power supplied from a battery 308 even when the power supply circuit 20 stops its outputs. Therefore, when the CPU 31 starts an operation in response to electric power supplied from the power supply circuit 20, it reads time information measured by the timer circuit 307 to detect a power OFF time period. The CPU 31 executes protection and recovery operations and the like of the printheads on the basis of the power OFF time period and standby time period.

Figure 4:
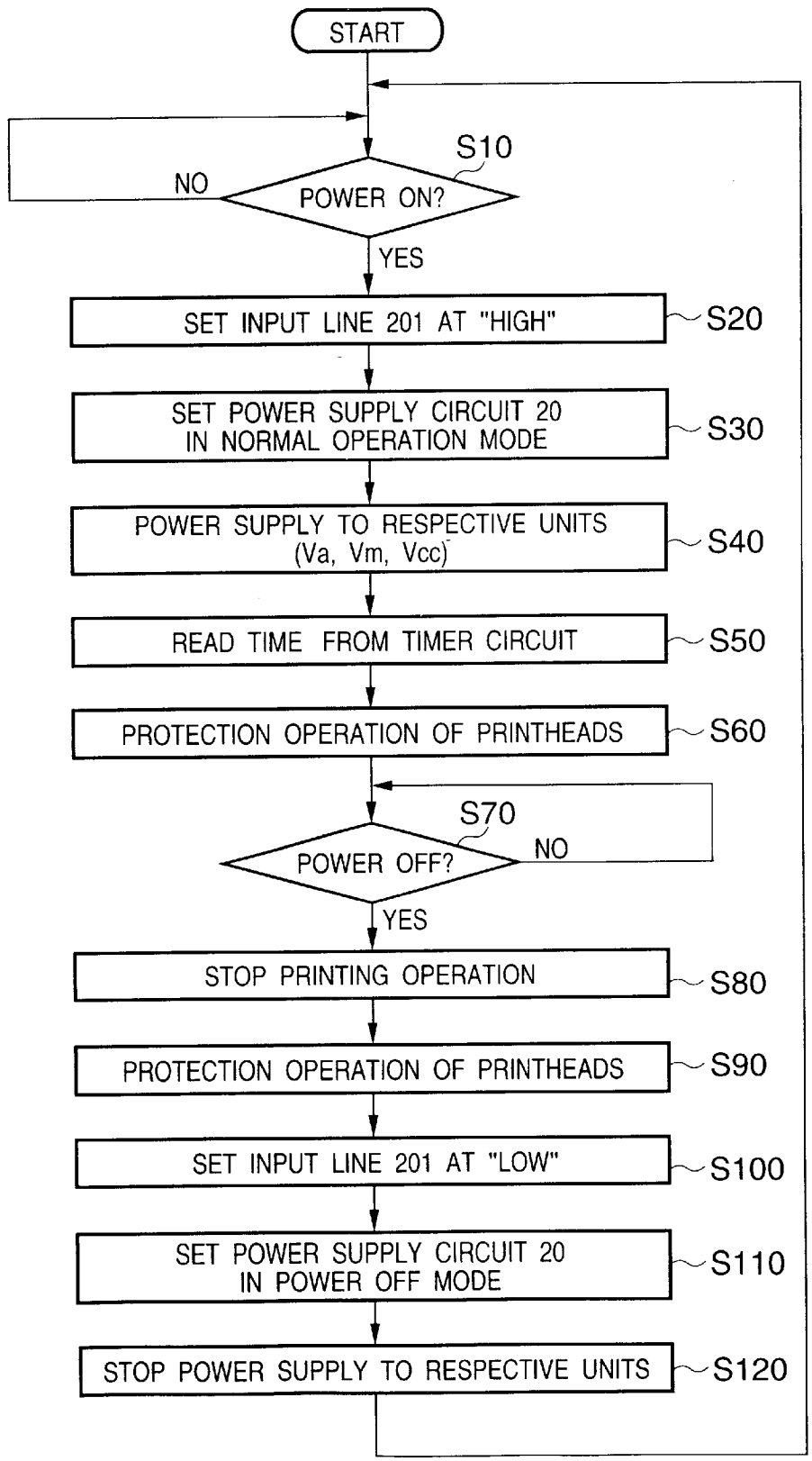
FIG. 4 is a flow chart showing power supply control and, especially, a consumption power reduction process upon power OFF.

The power supply control in the printing apparatus with the above arrangement, especially, a consumption power reduction process during power OFF will be described with reference to the flow chart shown in FIG. 4.

In step S10, the control waits until the power switch 401 of the console 40 is turned on in a power OFF state. If the power switch 401 is turned on, the flow advances to step S20, the output from the battery 308 is supplied to the input line 201 via a diode 307, resistor 304, and diode 302, and a signal supplied via the input line 201 changes to "High" level.

As a result, the power supply circuit 20 is set in the normal operation mode in step S30, and supplies three different outputs to the respective units of the printing apparatus in step S40, as described above. With this power supply, since the CPU 31 is enabled, it reads the time from the timer circuit 37 in step S50, and executes protection and recovery operations of the printheads and the like on the basis of the time difference between the read time and previous power OFF time in step S60.

After that, the CPU 31 monitors in step S70 if the power switch 401 provided to the console 40 is turned off. This monitor process is done by checking if the signal level at an input port 36-1 of the G.A. 36, which is pulled down by a resistor 303 (FIG. 3) is "High" or "Low" level.

If it is determined in step S70 that the power switch 401 is turned off, the flow advances to step S80, and the CPU 31 controls to stop a printing operation. Furthermore, the CPU 31 executes a series of operations such as protection of the printheads, and the like before it instructs the power supply circuit 20 to stop power supply in step S90. At this time, the power OFF time is recorded in an EEPROM as a nonvolatile memory as a part of an element that forms the ROM 32.

After that, in step S100 the CPU 31 controls a transistor 301 by a control signal from an output port 36-2 of the G.A. 36 shown in FIG. 3 to set the signal level supplied to the input line 201 to be "Low" level. In this manner, the power supply circuit 20 goes to the "power OFF mode" in step S110, and stops the aforementioned outputs in step S120. At this time, all power supplies other than power supply from the battery 308 to the timer circuit 37 are stopped.

The flow returns to step S10 to wait until the power switch 401 is turned on.

Therefore, according to the aforementioned embodiment, while the power switch 401 is OFF, only the timer circuit is driven by a battery power supply to measure time. When the power switch 401 is turned on, the power supply circuit is driven to start power supply to the respective units of the printing apparatus. When the CPU is enabled, it reads the time from the timer circuit, and can execute required protection and recovery operations on the basis of the difference between the read time and the previous power OFF time. When the power switch 401 is turned off, the power OFF time is recorded in the EEPROM, and after that, power supply to the respective units of the printing apparatus except for the timer circuit is stopped.

Hence, power supply to all building components of the apparatus except for the timer circuit that receives a battery power supply can be stopped irrespective of the circuit scale of the control circuit of the printing apparatus in response to a power OFF instruction by the power switch conventionally provided to the printing apparatus, thus reducing consumption power. Since such instruction is issued by the power switch, no special switch is required, thus contributing to cost reduction of the apparatus.

Another Embodiment

In the above embodiment, a trigger signal required for changing the operation mode of the power supply circuit from the power OFF state is obtained from the battery power supply. Alternatively, this embodiment will exemplify a case wherein the power supply circuit supplies electric power capable of changing its operation mode.

Figure 5:
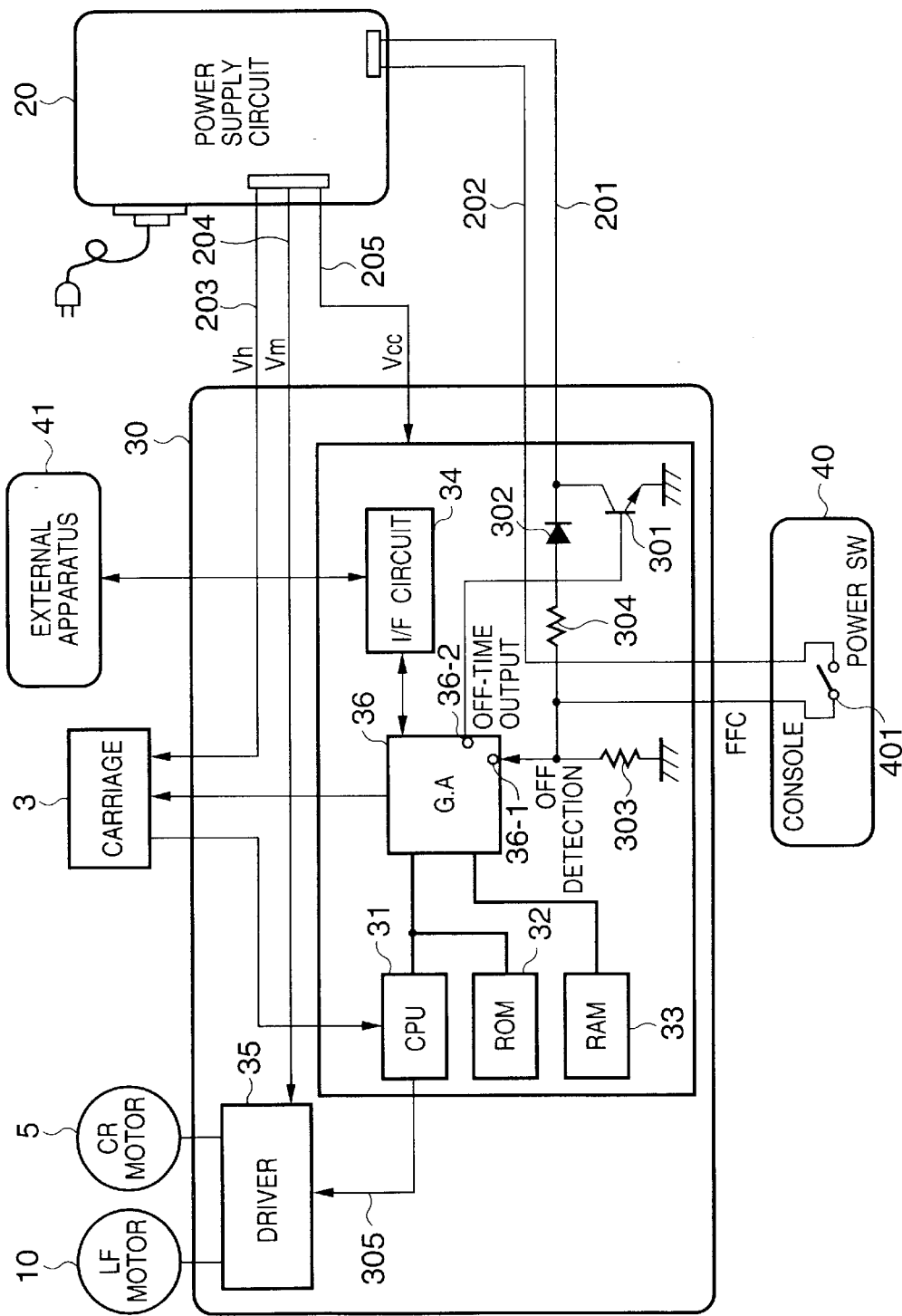
FIG. 5 is a block diagram showing the arrangement of a print controller of a printing apparatus according to another embodiment of the present invention.

FIG. 5 is a block diagram showing the arrangement of a print controller of a printing apparatus according to this embodiment. The same reference numerals and symbols in FIG. 5 denote the same building components and signals as those in the above embodiment, and a detailed description thereof will be omitted. Only an arrangement unique to this embodiment will be explained below.

As can be seen from comparison between FIGS. 3 and 5, this embodiment does not have any diode 306 shown in FIG. 3, and no Vcc line 205 from the power supply circuit 20 is connected to the power switch 401 via the diode 306. Instead, another output line 202 from the power supply circuit 20 is connected to the power switch 401. In this embodiment, the operation mode of the power supply circuit 20 is controlled by the input line 201 and output line 202.

Figure 6:
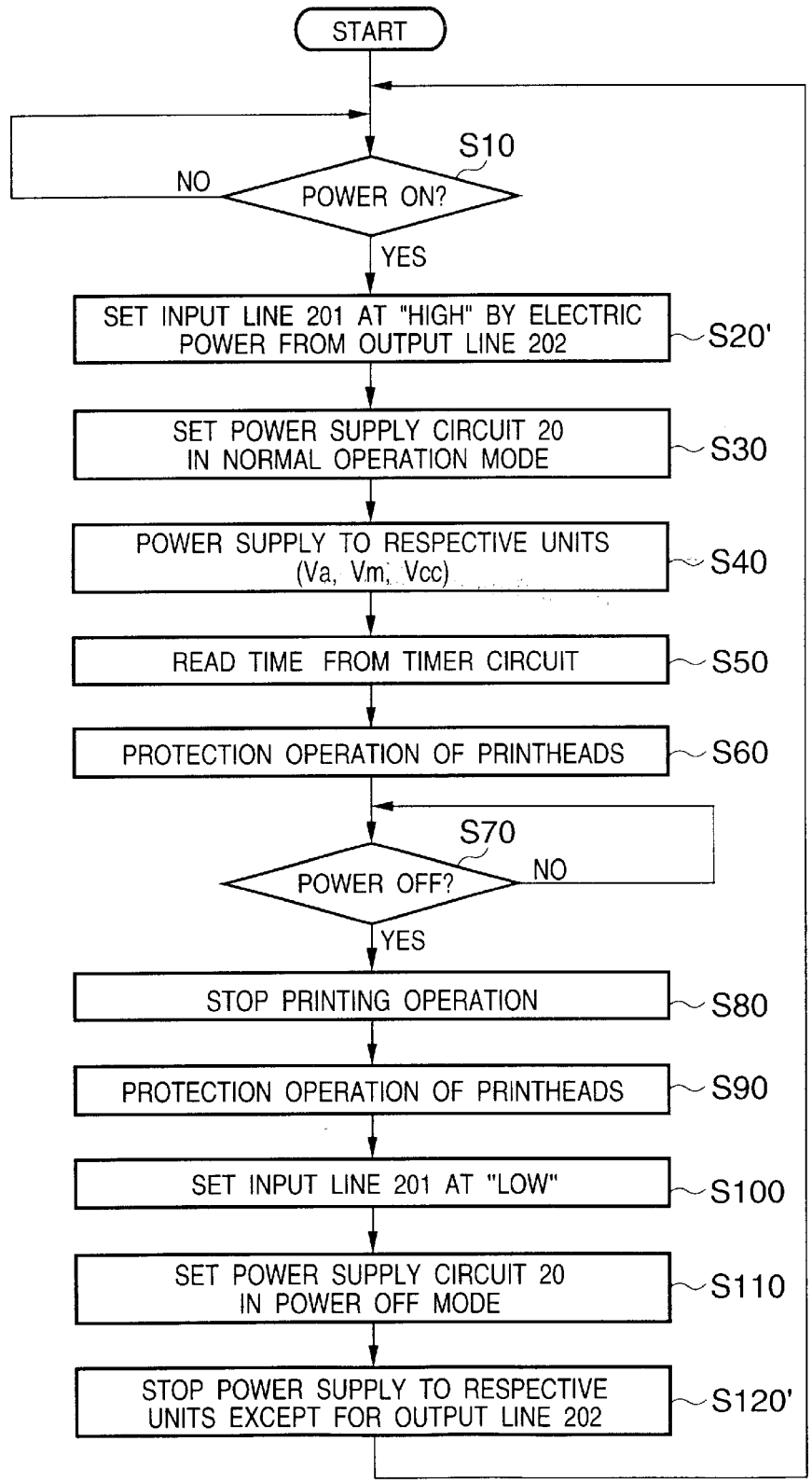
FIG. 6 is a flow chart showing power supply control and, especially, a consumption power reduction process upon power OFF according to another embodiment of the present invention.

The power supply control in the printing apparatus with the above arrangement, especially, a consumption power reduction process during power OFF will be described with reference to the flow chart shown in FIG. 6. The same step numbers in FIG. 6 denote the same processing steps as those described in the above embodiment, and a detailed description thereof will be omitted. Only processing steps unique to this embodiment will be explained below.

If it is detected in step S10 that the power switch 401 is turned on, the flow advances to step S20', the output from the power supply circuit 20 is supplied to the input line 201 via the output line 202, resistor 304, and diode 302, and a signal supplied via the input line 201 changes to "High" level.

Subsequently, the processes in steps S30 to S70 are executed as in the above embodiment.

If it is determined in step S70 that the power switch 401 is turned off, the processes in steps S80 to S110 are executed as in the above embodiment. After that, the power supply circuit 20 stops outputs other than the output line 202 in step S120'. At this time, the power supply circuit 20 continues to apply a voltage of 5 V via the output line 202, and this voltage is used as a trigger signal used upon next power ON.

The flow returns to step S10 to wait until the power switch 401 is turned on.

Therefore, according to the aforementioned embodiment, a problem such that the operation cannot be started when the battery power supply has run down can be solved, and the printing apparatus can always be enabled as long as it can receive power supply from a commercial power supply. Furthermore, since the power supply circuit supplies electric power only for detecting the next ON instruction of the power switch, power supply for the entire printing apparatus can greatly be reduced irrespective of the circuit scale of the print controller.

In the description of the above embodiment, an electronic device which operates upon receiving electric power is the printing apparatus. However, the present invention is not limited to such a specific apparatus. For example, the present invention can be applied to other electronic devices that require some operations even during a power OFF state, e.g., a personal computer, copying machine, and the like.

In the description of the above embodiment, a liquid droplet discharged from the printhead is ink, and the liquid stored in the ink tank is also ink. However, the liquid stored in the ink tank is not limited to ink. For example, the ink tank may store a processed liquid to be discharged onto a print medium so as to improve fixability and water repellency of a printed image or to improve its image quality.

Each of the embodiments described above has been exemplified in a printer, which comprises means (e.g., an electrothermal transducer, laser beam generator, and the like) for generating heat energy as energy utilized upon execution of ink discharge, and causes a change in the state of an ink by the heat energy, among the ink-jet printers.

According to this ink-jet printer and printing method, a high-density, high-precision printing operation can be attained.

As the typical arrangement and principle of the ink-jet printing system, one practiced by use of the basic principle disclosed in, for example, U.S. Pat. Nos. 4,723,129 and 4,740,796 is preferable. The above system is applicable to either one of the so-called on-demand type and a continuous type. Particularly, in the case of the on-demand type, the system is effective because, by applying at least one driving signal, which corresponds to printing information and gives a rapid temperature rise exceeding nucleate boiling, to each of electrothermal transducers arranged in correspondence with a sheet or liquid channels holding a liquid (ink), heat energy is generated by the electrothermal transducer to effect film boiling on the heat acting surface of the printhead. Consequently, a bubble can be formed in the liquid (ink) in one-to-one correspondence with the driving signal. By discharging the liquid (ink) through a discharge opening by growth and shrinkage of the bubble, at least one droplet is formed. If the driving signal is applied as a pulse signal, the growth and shrinkage of the bubble can be attained instantly and adequately to achieve discharge of the liquid (ink) with the particularly high response characteristics.

As the pulse driving signal, signals disclosed in U.S. Pat. Nos. 4,463,359 and 4,345,262 are suitable. Note that further excellent printing can be performed by using the conditions described in U.S. Pat. No. 4,313,124 of the invention which relates to the temperature rise rate of the heat acting surface.

As an arrangement of the printhead, in addition to the arrangement as a combination of discharge nozzles, liquid channels, and electrothermal transducers (linear liquid channels or right angle liquid channels) as disclosed in the above specifications, the arrangement using U.S. Pat. Nos. 4,558,333 and 4,459,600, which disclose the arrangement having a heat acting portion arranged in a flexed region is also included in the present invention. In addition, the present invention can be effectively applied to an arrangement based on Japanese Patent Laid-Open No. 59-123670 which discloses the arrangement using a slot common to a plurality of electrothermal transducers as a discharge portion of the electrothermal transducers, or Japanese Patent Laid-Open No. 59-138461 which discloses the arrangement having an opening for absorbing a pressure wave of heat energy in correspondence with a discharge portion.

Furthermore, as a full-line-type printhead having a length corresponding to the width of a maximum printing medium which can be printed by the printer, either the arrangement which satisfies the full-line length by combining plurality of printheads as disclosed in the above specification or the arrangement as a single printhead obtained by forming printheads integrally can be used.

In addition, not only a cartridge-type printhead in which an ink tank is integrally arranged on the printhead itself but also an exchangeable chip-type printhead, as described in the above embodiment, which can be electrically connected to the apparatus main unit and can receive an ink from the apparatus main unit upon being mounted on the apparatus main unit, can be applicable to the present invention.

It is preferable to add recovery means for the printhead, preliminary auxiliary means, and the like provided as an arrangement of the printer of the present invention since the printing operation can be further stabilized. Examples of such means include, for the printhead, capping means, cleaning means, pressurization or suction means, and preliminary heating means using electrothermal transducers, another heating element, or a combination thereof. It is also effective for stable printing to provide a preliminary discharge mode which performs discharge independently of printing.

Furthermore, as a printing mode of the printer, not only a printing mode using only a primary color such as black or the like, but also at least one of a multi-color mode using a plurality of different colors or a full-color mode achieved by color mixing can be implemented in the printer either by using an integrated printhead or by combining a plurality of printheads.

Moreover, in each of the above-mentioned embodiments of the present invention, it is assumed that the ink is a liquid. Alternatively, the present invention may employ an ink which is solid at room temperature or less and softens or liquefies at room temperature, or an ink which liquefies upon application of a use printing signal, since it is a general practice to perform temperature control of the ink itself within a range from 30° C. to 70° C. in the ink-jet system, so that the ink viscosity can fall within a stable discharge range.

In addition, in order to prevent a temperature rise caused by heat energy by positively utilizing it as energy for causing a change in state of the ink from a solid state to a liquid state, or to prevent evaporation of the ink, an ink which is solid in a non-use state and liquefies upon heating may be used. In any case, an ink which liquefies upon application of heat energy according to a printing signal and is discharged in a liquid state, an ink which begins to solidify when it reaches a printing medium, or the like, is applicable to the present invention. In this case, an ink may be situated opposite electrothermal transducers while being held in a liquid or solid state in recess portions of a porous sheet or through holes, as described in Japanese Patent Laid-Open No. 54-56847 or 60-71260. In the present invention, the above-mentioned film boiling system is most effective for the above-mentioned inks.

In addition, the ink-jet printer of the present invention may be used in the form of a copying machine combined with a reader, and the like, or a facsimile apparatus having a transmission/reception function in addition to an image output terminal of an information processing equipment such as a computer.

The present invention can be applied to a system constituted by a plurality of devices (e.g., host computer, interface, reader, printer) or to an apparatus comprising a single device (e.g., copy machine, facsimile).

Further, the object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, DVD-ROM, DVD-R, DVD-RAM, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A power supply apparatus which comprises a power supply unit for supplying electric power to a printing apparatus in accordance with an instruction from a power switch, comprising:

detection means for detecting an ON/OFF instruction to the power switch;

a battery for supplying electric power to said detection means even after the OFF instruction to the power switch is detected; and control means for controlling power supply from the power supply unit to the printing apparatus to stop when the OFF instruction to the power switch is detected, wherein the printing apparatus includes a timer circuit, and said timer circuit operates upon receiving electric power from said battery.

2. The apparatus according to claim 1, wherein the printing apparatus writes a time at an OFF instruction timing of the power switch into a nonvolatile memory, and when an ON instruction to the power switch is detected, and the printing apparatus becomes enabled later, the printing apparatus reads time information from the timer circuit, and executes a predetermined operation upon power ON on the basis of the read time information and the time written into the nonvolatile memory.

3. The apparatus according to claim 1, wherein said battery uses a part of an output from the power supply unit.

4. The apparatus according to claim 3, wherein the power supply unit has, as an operation mode, a first operation mode for supplying electric power to the printing apparatus, and a second operation mode for supplying electric power to only said battery, and said control means switches the operation mode of the power supply unit in accordance with a detection result of said detection means.

5. The apparatus according to claim 4, wherein when the OFF instruction to the power switch is detected, said control means switches the power supply unit to the second mode.

6. A method of controlling power supply from a power supply unit to a printing apparatus including a timer circuit in accordance with an instruction from a power switch, comprising:

a detection step of detecting an ON/OFF instruction to the power switch by a detector;

a power supply step of supplying electric power from a battery of the power supply unit to the detector even after the OFF instruction to the power switch is detected; and a control step of controlling power supply from the power supply unit to the printing apparatus to stop when the OFF instruction to the power switch is detected, wherein said timer circuit operates upon receiving electric power from said battery.

* * * * *

UNITED STATES PATENT AND TRADEMARK OFFICE
CERTIFICATE OF CORRECTION

PATENT NO.     : 6,782,481 B2
DATED          : August 24, 2004
INVENTOR(S)    : Akiyoshi Shimoda It is certified that error appears in the above-identified patent and that said Letters Patent is hereby corrected as shown below:

<u>Column 4,</u>
Line 23, "timing" should read -- time --.

<u>Column 8,</u>
Line 7, "a" should be deleted.

Signed and Sealed this

Fourth Day of January, 2005

JON W. DUDAS
*Director of the United States Patent and Trademark Office*